United States Patent
Hatfield et al.

(10) Patent No.: US 10,502,112 B2
(45) Date of Patent: Dec. 10, 2019

(54) INJECTOR FOR REDUCTANT DELIVERY UNIT HAVING FLUID VOLUME REDUCTION ASSEMBLY

(71) Applicant: Continental Automotive Systems, Inc., Auburn Hills, MI (US)

(72) Inventors: Josh Lee Hatfield, Newport News, VA (US); Stephen C Bugos, Poquoson, VA (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 100 days.

(21) Appl. No.: 15/704,294

(22) Filed: Sep. 14, 2017

(65) Prior Publication Data

US 2019/0078486 A1  Mar. 14, 2019

(51) Int. Cl.
*F01N 3/20* (2006.01)
*F01N 3/28* (2006.01)

(52) U.S. Cl.
CPC ........... *F01N 3/2066* (2013.01); *F01N 3/206* (2013.01); *F01N 3/2896* (2013.01);
(Continued)

(58) Field of Classification Search
CPC ...... F01N 3/2066; F01N 3/206; F01N 3/2896; F01N 2530/18; F01N 2610/02;
(Continued)

(56) References Cited

U.S. PATENT DOCUMENTS 5,275,341 A * 1/1994 Romann ............... F02M 51/005
239/585.4
5,383,606 A * 1/1995 Stegmaier .......... F02M 51/0682
239/575
(Continued)

FOREIGN PATENT DOCUMENTS

DE 102008042987 A1 4/2010
JP 2002327660 A 11/2002
(Continued)

OTHER PUBLICATIONS

File history of U.S. Appl. No. 15/704,268, including non-final Office Action dated May 1, 2019.
(Continued)

*Primary Examiner* — Chee-Chong Lee
*Assistant Examiner* — Joseph A Greenlund

(57) ABSTRACT

A fluid injector, including a fluid inlet, a fluid outlet and a fluid path from the fluid inlet to the fluid outlet; a tube having an end at the fluid inlet; a filter disposed in the tube proximal to the fluid inlet; and a volume reduction member disposed in the tube downstream of the filter, contacting an inner surface of the tube and including a through-bore defining at least a portion of the fluid path, the bore having a smaller diameter than an inner diameter of the tube and the volume reduction member occupying a volume in the tube such that the volume reduction member reduces an amount of space for fluid in the fluid injector. A cap member, in which the filter is disposed, engages with the volume reduction mem-
(Continued)

ber such that the filter, the volume reduction member and the cap form a single assembly member.

21 Claims, 9 Drawing Sheets

(52) U.S. Cl.
CPC ...... *F01N 2530/18* (2013.01); *F01N 2610/02* (2013.01); *F01N 2610/1433* (2013.01); *F01N 2610/1453* (2013.01)

(58) Field of Classification Search
CPC ..... F01N 2610/1433; F01N 2610/1453; F01N 2610/1426
USPC ...................... 239/533.3, 569, 575
See application file for complete search history.

(56) References Cited

U.S. PATENT DOCUMENTS

| | | | | |
|---|---|---|---|---|
| 5,516,424 | A * | 5/1996 | Strohschein | B01D 29/23 210/232 |
| 5,634,597 | A * | 6/1997 | Krohn | F02M 51/061 239/585.5 |
| 5,794,856 | A * | 8/1998 | Nally | F02M 69/047 239/408 |
| 6,173,915 | B1 * | 1/2001 | Cohen | F02M 51/0667 239/585.1 |
| 6,199,775 | B1 * | 3/2001 | Dallmeyer | F02M 37/22 123/470 |
| 6,264,112 | B1 * | 7/2001 | Landschoot | F02M 51/0667 239/5 |
| 6,676,044 | B2 * | 1/2004 | Dallmeyer | F02M 51/005 239/585.1 |
| 6,685,112 | B1 * | 2/2004 | Hornby | F02M 51/0664 239/533.2 |
| 6,698,664 | B2 * | 3/2004 | Dallmeyer | F02M 51/0682 239/5 |
| 6,834,667 | B2 * | 12/2004 | Sumiya | F02M 51/0671 137/15.18 |
| 7,128,281 | B2 * | 10/2006 | Cho | F02M 51/0682 239/585.1 |
| 7,296,781 | B2 * | 11/2007 | Akabane | F02M 51/0657 239/585.1 |
| 7,309,033 | B2 * | 12/2007 | Dallmeyer | F02M 51/005 239/585.1 |
| 7,389,952 | B2 * | 6/2008 | Dallmeyer | F02M 51/005 239/585.1 |
| 7,422,160 | B2 * | 9/2008 | Dallmeyer | F02M 51/005 239/5 |
| 7,431,226 | B2 * | 10/2008 | Cho | F02M 51/0682 239/533.2 |
| 7,481,049 | B2 * | 1/2009 | Huber | F01N 3/2066 239/128 |
| 7,506,826 | B2 * | 3/2009 | Miller | B05B 1/302 239/585.1 |
| 7,552,880 | B2 * | 6/2009 | Dallmeyer | F02M 51/0682 239/533.14 |
| 7,617,605 | B2 * | 11/2009 | Fochtman | B23K 26/0823 123/470 |
| 7,617,991 | B2 * | 11/2009 | Wells | F02M 61/165 239/5 |
| 7,798,131 | B2 * | 9/2010 | Hornby | F02M 51/061 123/491 |
| 7,866,577 | B2 * | 1/2011 | Yoshimaru | F02M 51/0682 239/533.12 |
| 7,886,718 | B2 * | 2/2011 | Manubolu | F02M 47/027 123/472 |
| 7,942,348 | B2 * | 5/2011 | Reiter | F02M 51/0675 123/470 |
| 7,942,381 | B2 * | 5/2011 | Sugiyama | F02M 51/0685 239/585.1 |
| 8,002,287 | B2 * | 8/2011 | Wagner | F16L 5/10 277/551 |
| 8,037,868 | B2 * | 10/2011 | Kannan | F02M 55/004 123/456 |
| 8,087,239 | B2 * | 1/2012 | Bugos | F01N 3/2066 60/298 |
| 8,347,605 | B2 * | 1/2013 | Bugos | F01N 3/0821 60/286 |
| 8,740,113 | B2 * | 6/2014 | Roessle | F01N 3/2066 239/585.1 |
| 8,997,463 | B2 * | 4/2015 | Bugos | B01D 53/90 60/286 |
| 8,998,114 | B2 * | 4/2015 | Olivier | F01N 3/2066 239/585.1 |
| 9,200,604 | B2 * | 12/2015 | Derenthal | F02M 51/061 |
| 9,273,581 | B2 * | 3/2016 | Van Vuuren | F01N 3/208 |
| 9,587,603 | B2 * | 3/2017 | Hanjagi | F02M 37/0029 |
| 9,605,638 | B2 * | 3/2017 | Falaschi | F02M 61/165 |
| 9,777,859 | B2 * | 10/2017 | van Vuuren | F16K 27/00 |
| 9,822,749 | B2 * | 11/2017 | Derenthal | F02M 61/168 |
| 10,227,906 | B2 * | 3/2019 | McFarland | F01N 3/206 |
| 2002/0104904 | A1 * | 8/2002 | McFarland | F02M 51/005 239/585.1 |
| 2005/0023383 | A1 | 2/2005 | Morton | |
| 2005/0133639 | A1 * | 6/2005 | Hornby | F02M 51/005 239/585.1 |
| 2005/0173869 | A1 * | 8/2005 | Wagner | F16L 5/10 277/602 |
| 2005/0269426 | A1 * | 12/2005 | Cho | F02M 51/0682 239/533.2 |
| 2007/0095745 | A1 * | 5/2007 | Sebastian | F02M 51/0667 210/439 |
| 2007/0114299 | A1 | 5/2007 | Scheffel | |
| 2009/0179090 | A1 * | 7/2009 | Reiter | F02M 51/0682 239/585.1 |
| 2009/0229575 | A1 * | 9/2009 | Giorgetti | F02M 55/025 123/470 |
| 2009/0230677 | A1 * | 9/2009 | Mannucci | F02M 55/004 285/318 |
| 2010/0213286 | A1 * | 8/2010 | Grandi | F02M 51/061 239/575 |
| 2011/0192140 | A1 | 8/2011 | Oliver | |
| 2011/0309166 | A1 | 12/2011 | Thomas et al. | |
| 2014/0054394 | A1 * | 2/2014 | Bugos | F01N 3/10 239/132.3 |
| 2014/0075923 | A1 * | 3/2014 | Hodgson | F01N 3/2066 60/282 |
| 2014/0138568 | A1 * | 5/2014 | van Vuuren | F16K 27/00 251/357 |
| 2015/0059322 | A1 * | 3/2015 | Bugos | F01N 3/2066 60/298 |
| 2015/0115051 | A1 | 4/2015 | Van Vuuren | |
| 2015/0369176 | A1 * | 12/2015 | Ittlinger | B01D 29/56 239/575 |
| 2019/0078482 | A1 | 3/2019 | Cosby et al. | |
| 2019/0078485 | A1 * | 3/2019 | VanVuuren | F01N 3/2066 |
| 2019/0078486 | A1 * | 3/2019 | Hatfield | F01N 3/2066 |
| 2019/0078487 | A1 * | 3/2019 | Hatfield | F01N 3/2066 |
| 2019/0078488 | A1 * | 3/2019 | Hatfield | F01N 3/2066 |

FOREIGN PATENT DOCUMENTS

| | | |
|---|---|---|
| JP | 2004316520 A | 11/2004 |
| JP | 2010216483 A | 9/2010 |
| WO | 20170045845 A1 | 3/2017 |

OTHER PUBLICATIONS

Japanese Office Action dated Aug. 5, 2019 for corresponding Japanese Pat. App. No. 2018-172919.

* cited by examiner

INJECTOR FOR REDUCTANT DELIVERY UNIT HAVING FLUID VOLUME REDUCTION ASSEMBLY

CROSS-REFERENCE TO RELATED APPLICATIONS

The present application is related to U.S. patent application Ser. No. 15/704,268, filed Sep. 14, 2017, and titled, "INJECTOR FOR REDUCTANT DELIVERY UNIT HAVING REDUCED FLUID VOLUME"; U.S. patent application Ser. No. 15/704,331, filed Sep. 14, 2017, and titled, "SEAL MEMBER FOR REDUCTANT DELIVERY UNIT"; and U.S. patent application Ser. No. 15/704,402, filed Sep. 14, 2017, and titled, "INJECTOR FOR REDUCTANT DELIVERY UNIT HAVING FLUID VOLUME REDUCTION ASSEMBLY". The content of the above applications are hereby incorporated by reference herein in their entirety.

FIELD OF INVENTION

The present invention generally relates to a fluid injector of a reductant delivery unit (RDU), and particularly to a robust RDU fluid injector for non-purge applications.

BACKGROUND

Emissions regulations in Europe and North America are driving the implementation of new exhaust aftertreatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide emissions (NOx) that are difficult to treat in oxygen-rich exhaust environments characteristic of lean-burn combustion. Exhaust aftertreatment technologies are currently being developed that treat NOx under these conditions.

One of these technologies includes a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR). Ammonia is difficult to handle in its pure form in the automotive environment, therefore it is customary with these systems to use a diesel exhaust fluid (DEF) and/or liquid aqueous urea solution, typically at a 32% concentration of urea ($CO(NH_2)_2$). The solution is referred to as AUS-32, and is also known under its commercial name of AdBlue. The reductant solution is delivered to the hot exhaust stream typically through the use of an injector, and is transformed into ammonia prior to entry in the catalyst. More specifically, the solution is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide ($CO_2$), the ammonia resulting from the thermolysis and the hydrolysis then undergoes a catalyzed reaction with the nitrogen oxides as described previously.

AUS-32, or AdBlue, has a freezing point of −11 C, and system freezing is expected to occur in cold climates. Since these fluids are aqueous, volume expansion happens after the transition to the solid state upon freezing. The expanding solid can exert significant forces on any enclosed volumes, such as an injector. This expansion may cause damage to the injection unit, so different SCR strategies exist for addressing reductant expansion.

There are two known SCR system strategies in the marketplace: purge systems and non-purge systems. In purge SCR systems, the reductant urea and/or DEF solution is purged from the RDU when the vehicle engine is turned off. In non-purge SCR systems, the reductant remains in the RDUs throughout the life of the vehicle. During normal operation of a non-purge SCR system, the RDU injector operates at temperatures which are above the freezing point of the reductant such that reductant in the RDU remains in the liquid state. When the vehicle engine is turned off in the non-purge SCR system, however, the RDU injector remains filled with reductant, thereby making the RDU injector susceptible to damage from reductant expanding in freezing conditions.

SUMMARY

Example embodiments overcome shortcomings found in existing RDU fluid injectors and provide an improved fluid injector for non-purge SCR systems in which the adverse effects from the RDU being in temperatures that are below the freezing point of reductant are reduced. According to an example embodiment, an RDU includes a fluid injector having a fluid inlet disposed at a first end of the fluid injector for receiving a reductant, and a fluid outlet disposed at a second end of the fluid injector for discharging the reductant, the fluid injector defining a fluid path for the reductant from the fluid inlet to the fluid outlet. The fluid injector further includes a tube member having an end disposed at the fluid inlet of the fluid injector, the tube member configured to pass reductant along the fluid path, and a filter disposed in the tube member proximal to the fluid inlet of the fluid injector. A volume reduction member is disposed in the tube member downstream of the filter, relative to a direction of reductant flow from the fluid inlet to the fluid outlet of the fluid injector, contacts an inner surface of the tube member, and includes a bore defined through the volume reduction member. The bore defines at least a portion of the fluid path through the fluid injector and has a smaller diameter than an inner diameter of the tube member such that the volume reduction member occupies a volume in the tube member so as to reduce a volume of the fluid path for reductant to occupy in the fluid injector. Further, the fluid injector includes a cap member in which the filter is disposed. In an example embodiment, the cap member is engaged with the volume reduction member such that the filter, the volume reduction member and the cap form a single member.

In an example embodiment, the volume reduction member includes a first portion and a second portion, wherein the first portion has a smaller outer diameter than an outer diameter of the second portion and the cap member is engaged with the first portion of the volume reduction member. The cap member and at least the first portion of the volume reduction member are metal and/or have a metal composition.

Further, at least some of the first portion of the volume reduction member is disposed within the cap member such that an outer diameter of the cap member is equal to the outer diameter of the second portion of the volume reduction member.

In an example embodiment, the cap member has a press fit engagement with the first portion of the volume reduction member. In another example embodiment, the cap member is welded to the first portion of the volume reduction member.

The volume reduction member may include an angled surface between the first portion and the second portion, the angled surface being at an angle other than an angle that is orthogonal to a longitudinal axis of the volume reduction member.

In some example embodiments, the first portion and a first part of the second portion of the volume reduction member are of a metal composition and a second part of the second portion of the volume reduction member is a plastic composition. In an example embodiment, the second part of the second portion of the volume reduction member is overmolded over at least some of the first part of the second portion thereof. Further, the first part of the second portion of the volume reduction member defines a ledge which the second part of the second portion of the volume reduction member is molded around, the ledge being disposed radially inwardly of the outer diameter of the second portion of the volume reduction member.

In an example embodiment, the cap member includes a cylindrically shaped sidewall having first and second axial ends, and an annular member which extends radially inwardly from the first axial end, and wherein the second axial end of the cap member is disposed around and is engaged with a portion of the volume reduction member.

BRIEF DESCRIPTION OF THE DRAWINGS

Aspects of the invention will be explained in detail below with reference to an exemplary embodiment in conjunction with the drawings, in which.

DETAILED DESCRIPTION

The following description of the example embodiment(s) is merely exemplary in nature and is in no way intended to limit the invention, its application, or uses.

Example embodiments are generally directed to an RDU for a non-purge SCR system in which damaging effects from a reductant, DEF and/or urea solution freezing in the RDU injector are reduced.

Figure 1:
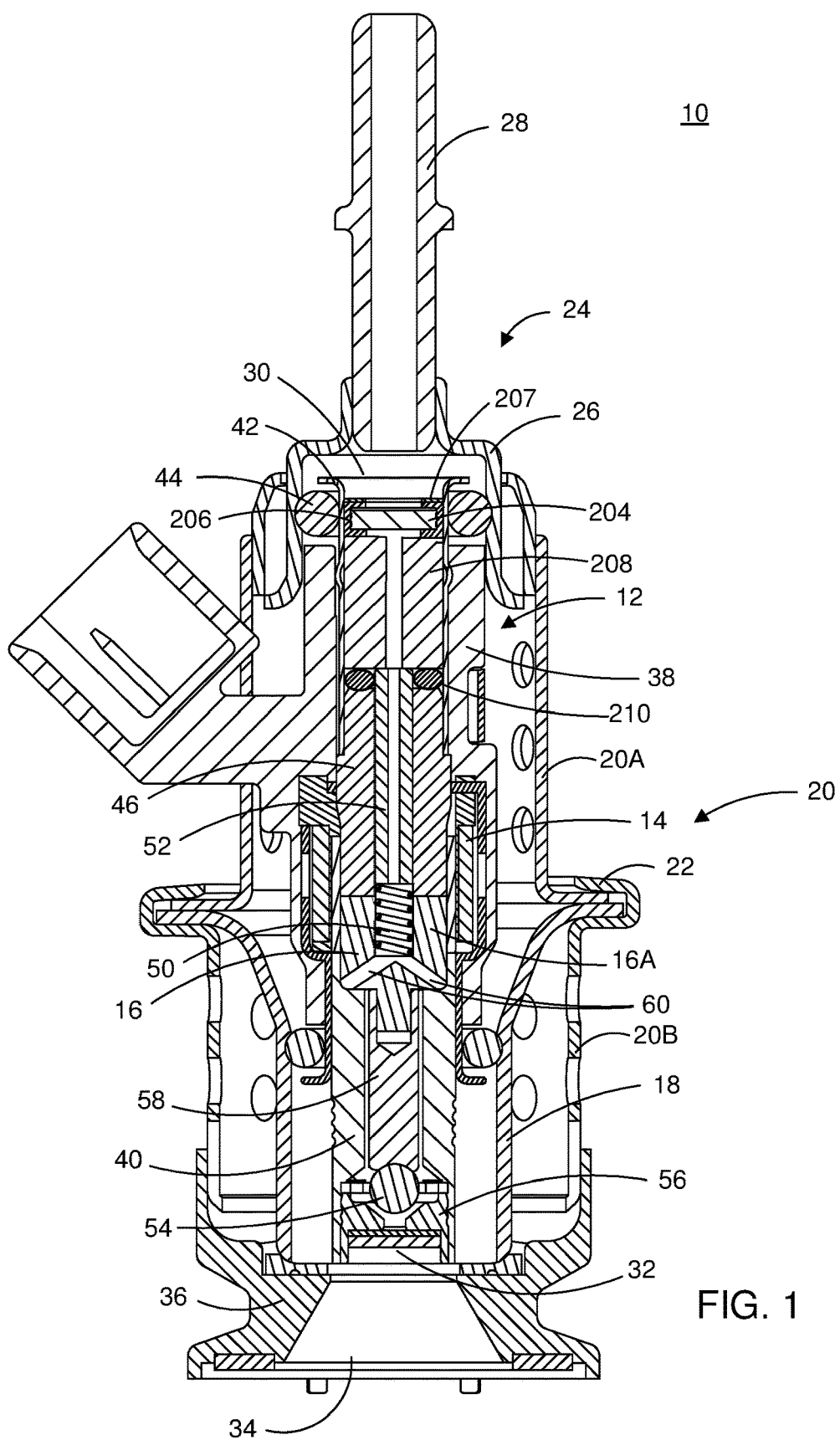
FIG. 1 is a cross-sectional side view of an RDU for a non-purge SCR system according to an example embodiment.
Figure 2:
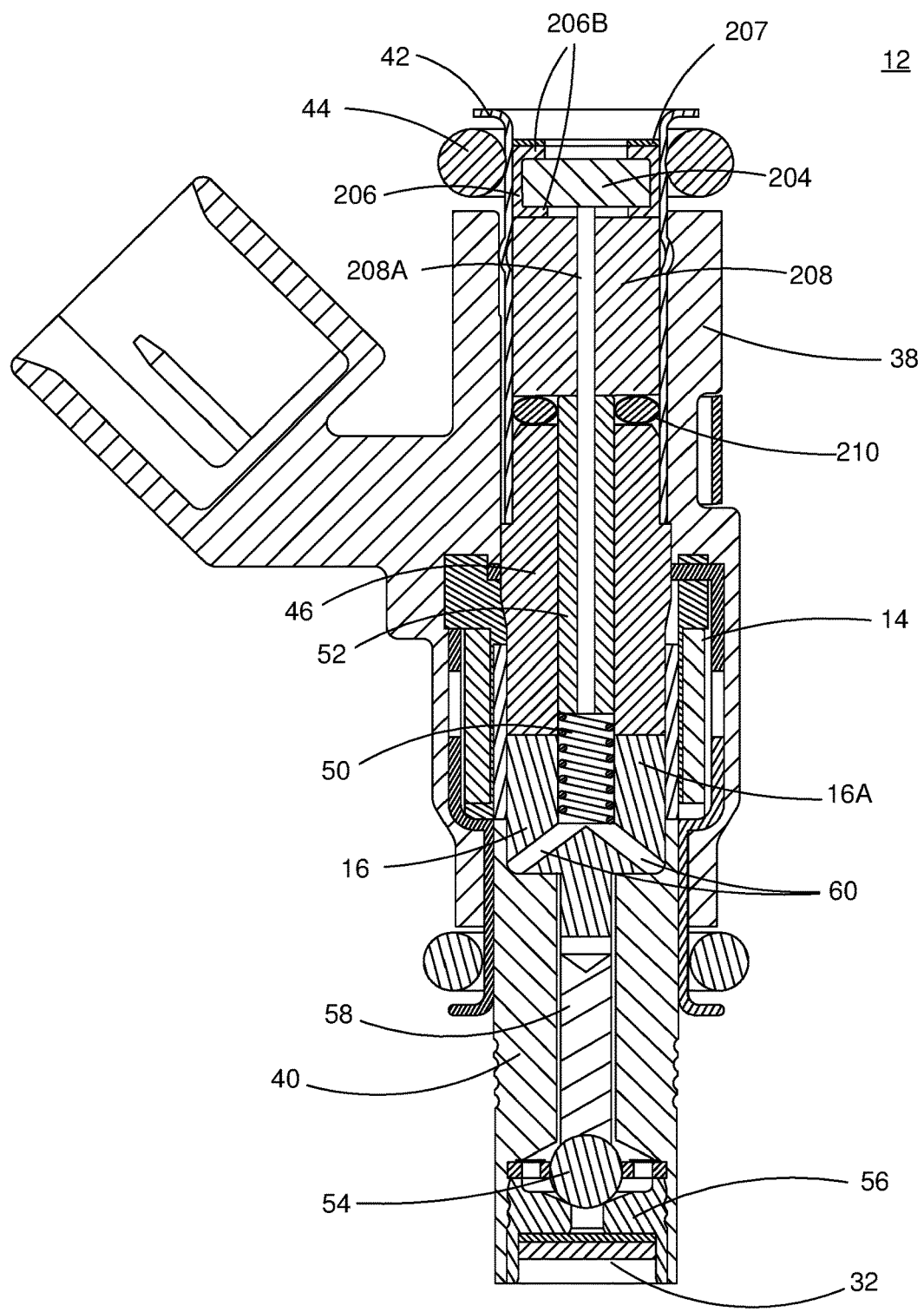
FIG. 2 is a cross-sectional side view of a fluid injector of the RDU of FIG. 1.

FIG. 1 illustrates an RDU 10 of a non-purge SCR system according to an example embodiment. RDU 10 includes a solenoid fluid injector, generally indicated at 12, that provides a metering function of fluid and provides the spray preparation of the fluid into the exhaust path of a vehicle in a dosing application. Thus, fluid injector 12 is constructed and arranged to be associated with an exhaust gas flow path upstream of a selective catalytic reduction (SCR) catalytic converter (not shown). Fluid injector 12 may be an electrically operated, solenoid fuel injector. As shown in FIGS. 1 and 2, fluid injector 12 includes an actuator unit having a coil 14 and a movable armature 16. Components of injector 12 define a fluid path for a reductant, DEF and/or urea solution through injector 12. The reductant, DEF and/or urea solution which RDU 10 is configured to inject into the exhaust path of a vehicle engine will be hereinafter referred to as "reductant" for simplicity.

Fluid injector 12 is disposed in an interior carrier 18 of RDU 10, as shown in FIG. 1. An injector shield, generally indicated at 20, is formed by upper shield 20A and lower shield 20B, which surround injector 12 and are coupled to carrier 18 by folding tangs of a flange 22 of lower shield 20B over shelf features of carrier 18 and upper shield 20A. As a result, shield 20 and carrier 18 are fixed with respect to injector 12.

An inlet cup structure of RDU 10, generally indicated at 24 in FIG. 1, includes a cup 26 and a fluid supply tube 28 integrally formed with cup 26. Fluid supply tube 28 is in communication with a source of a reductant (not shown) that is fed into a fluid inlet 30 of injector 12 for ejection from a fluid outlet 32 thereof and into the exhaust stream of a vehicle engine (not shown). Fluid inlet 30 of injector 12 is in fluid communication with fluid supply tube 28. Fluid outlet 32 is fluidly connected with a flange outlet 34 of an exhaust flange 36 that is coupled directly with an end of lower shield 20B of RDU 10.

Injector 12 includes an injector body structure in which the components of injector 12 are disposed. The injector body structure includes a first injector body portion 38 in which coil 14 and armature 16 are disposed, and a valve body portion 40 in which a valve assembly of injector 12 is at least partly disposed. First injector body portion 38 and valve body portion 40 are fixedly connected, either directly or indirectly, to each other.

Figure 3:
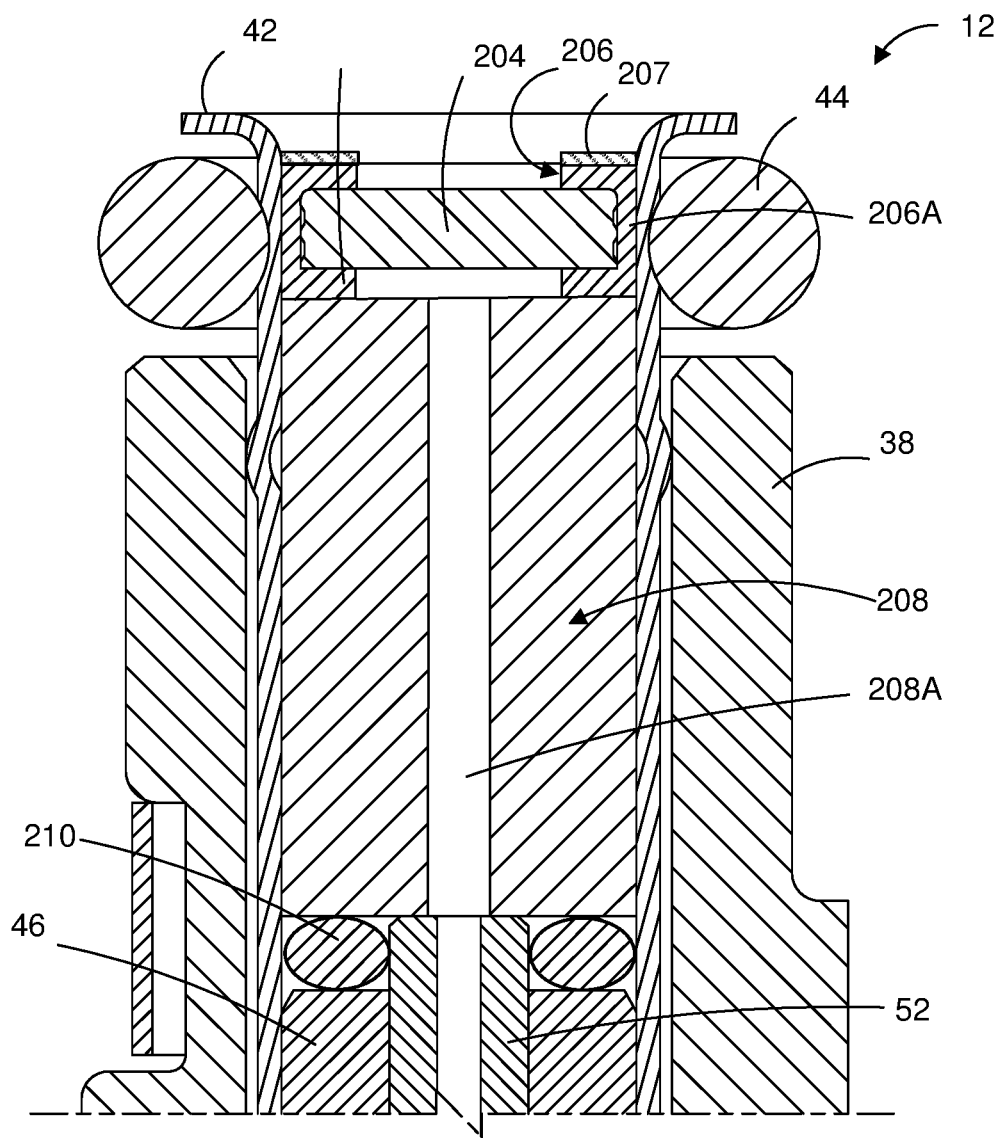
FIG. 3 is a magnified cross-sectional view of the inlet portion of the fluid injector of the RDU of FIG. 1 according to an example embodiment.

Referring to FIGS. 1-3, fluid injector 12 includes a tube member 42 which is at least partly disposed within first injector body portion 38. The outer surface of tube member 42 contacts the inner surface of first injector body portion 38. An open end of tube member 42 is disposed within cup 26 and is in fluid communication with fluid supply tube 28. An O-ring 44 is disposed within cup 26, between an inner surface thereof and the outer surface of tube member 42, proximal to the open end of tube member 42. O-ring 44 serves to ensure that reductant exiting fluid supply tube 28 passes into the open end of tube member 42 of injector 12.

The actuator unit of fluid injector 12 further includes a pole piece 46 which is fixedly disposed within first injector body portion 38. Coil 14 at least partly surrounds pole piece 46 and armature 16. Pole piece 46 is disposed upstream of armature 16 within injector 12. Pole piece 46 includes a central bore defined axially therethrough.

Armature 16 includes a U-shaped section which defines a pocket in which at least part of a spring 50 is disposed.

Spring 50, which is part of the actuator unit, biases movable armature 16 so that armature 16 is spaced apart from pole piece 46 when no current is passed through coil 14. Spring 50 partly extends within the central bore of pole piece 46. An end of spring 50 which extends within pole piece 46 contacts a spring adjustment tube 52. Spring adjustment tube 52 is at least partly disposed within the central bore of pole piece 46, upstream (relative to a direction of flow of reductant through injector 12) of spring 50. Spring adjustment tube 52 includes a bore defined axially therethrough. The throughbore of spring adjustment tube 52 partly defines the fluid path for reductant in fluid injector 12, and defines the only fluid path for reductant through pole piece 46. Due to its engagement with spring 50, spring adjustment tube 52 is used to calibrate the dynamic flow of reductant through fluid injector 12.

Armature 16 further includes one or more channels 60 (FIGS. 1 and 2) defined through the armature 16 from an interior of the pocket to an upstream end portion of pin member 58. Channels 60 may be equally spaced about armature 16. In an example embodiment, armature 16 includes a single channel which is defined entirely around the base of the pocket formed by pocket wall 16A. Channel(s) 60 allows reductant to flow from the pocket of armature 16 to the space around the upstream end of pin member 58. The pocket of armature 16 and the channel(s) 60 together partly define the reductant fluid path of the fluid injector 12 and define the only part of the fluid path passing through or around armature 16.

Figure 5:
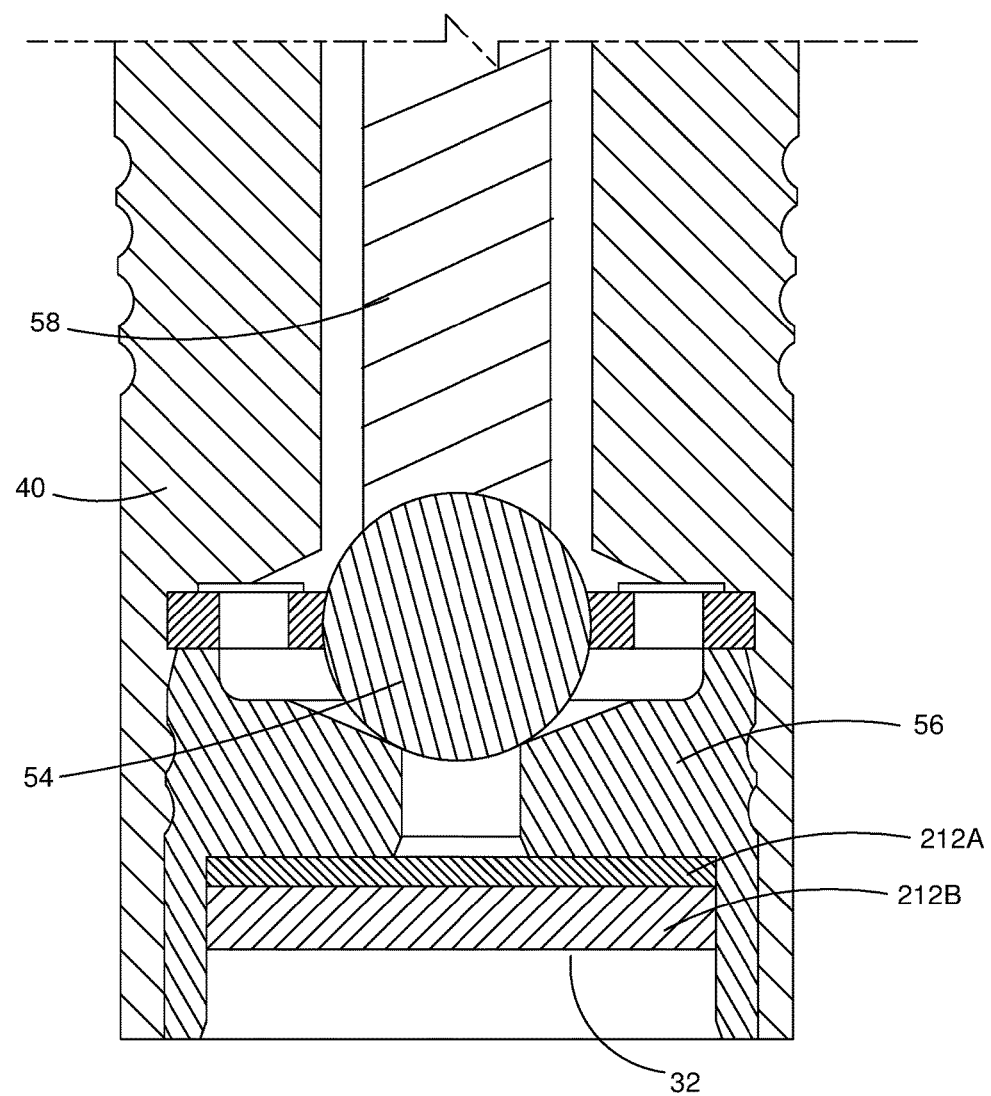
FIG. 5 is a magnified cross-sectional view of the outlet portion of the fluid injector of the RDU of FIG. 1 according to an example embodiment.

Referring to FIGS. 1, 2 and 5, the valve assembly of injector 12 includes a seal member 54 and a seat 56. Seal member 54 is connected to armature 16 via a pin member 58, which is disposed between seal member 54 and the downstream end of armature 16. Seal member 54, pin member 58 and armature 16 may combine to form an armature assembly. When coil 14 is energized, coil 14 generates an electromagnetic force acting on armature 16 which overcomes the bias force from spring 50 and causes armature 16 to move towards pole piece 46, which correspondingly moves pin member 58 so that seal member 54 is lifted off of, and disengages from, seat 56, moving the armature assembly to an open position and thus permitting reductant to pass through fluid outlet 32 to flange outlet 34 and into the exhaust path of the vehicle engine. When coil 14 is de-energized, the electromagnetic force dissipates and spring 50 biases armature 16 so that armature 16 is moved away from pole piece 46, resulting in seal member 54 sealingly engaging with seat 56, changing the armature assembly back to a closed position. With the armature assembly in the closed position, reductant is prevented from flowing through seat 56 and flange outlet 34 and into the exhaust path of the vehicle engine.

As mentioned above, RDU 10 forms part of a non-purge SCR exhaust aftertreatment system. As a result, reductant remains in fluid injector 12 following the vehicle engine being turned off. In example embodiments, fluid injector 12 is configured so that the amount of reductant in fluid injector 12 is reduced. In other words, the total volume of the fluid path for reductant through fluid injector 12 is reduced. By having less space for reductant in injector 12, the amount of reductant in RDU 10 that may potentially freeze is reduced, thereby reducing the susceptibility of injector 12 being damaged by expansion forces from frozen reductant.

In order to reduce the volume of the reductant fluid path in fluid injector 12, the thickness of valve body portion 40 is increased. In addition, pin member 58 is constructed as a solid element such that reductant flows around the outer surface of pin member 58, instead of therethrough. The spacing between the outer surface of pin 58 and the inner surface of valve body portion 40, which partly defines the fluid path for reductant through fluid injector 12, is narrowed. This narrowed portion of the fluid path is the only fluid path for reductant between armature 16 and seat 56 in fluid injector 12. The narrowed fluid path between pin 58 and valve body portion 40 provides a sufficient reductant flow rate through fluid injector 12 for performing reductant injection during normal operation of RDU 10 while at the same time maintaining a relatively small volume of reductant within injector 12 so as to lessen the risk of injector 12 being damage from the reductant therein freezing.

Further, the diameter of the pocket of armature 16, in which spring 50 is at least partly disposed, is reduced, which allows for the thickness of pocket wall 16A of armature 16 to be increased. In an example embodiment, the thickness of pocket wall 16A is between 45% and 75% of the diameter of pocket, such as about 60%. The increase in thickness of pocket wall 16A, as well as the increased thickness of valve body portion 40 and pin member 50 being a solid pin, result in the components of injector 12 being strengthened and thus more resistant to reductant freezing forces.

Still further, the bore of spring adjustment tube 52 is sized for reducing the volume of the reductant fluid path in injector 12. In an example embodiment, the diameter of the bore of spring adjustment tube 52 is between 12% and 22% of the outer diameter of pole piece 46, and particularly between 16% and 19% thereof.

FIG. 3 illustrates an upstream portion of injector 12. Tube member 42 extends at least partly though injector 12. The reductant fluid path through injector 12 passes through tube member 42. Injector 12 includes a filter 204 disposed within tube member 42 proximal to the open end thereof. Filter 204 is a structurally rigid, sintered metal filter, such as a stainless steel material, in order to better withstand expansion forces from reductant freezing. Filter 204 may have a supporting outer structure for added strength. Best seen in FIG. 3, filter 204 is disposed within a cap member 206. Cap member 206 is largely cylindrically shaped having a sidewall 206A extending circumferentially and defining an inner volume sized for receiving filter 204 therein. Cap member 206 is dimensioned to fit within tube member 42, and particularly so that the outer surface of sidewall 206A of cap member 206 contacts the inner surface of tube member 42. Cap member 206 further includes annular members 206B disposed along the axial ends of cap member 206 and extend radially inwardly from sidewall 206A. Annular members 206B serve to maintain filter 204 within cap member 206 in a fixed position. Cap member 206 is constructed of metal or like compositions.

Injector 12 further includes a retaining ring 207 which is disposed in tube member 42 upstream of, and in contact with, cap member 206, as shown in FIGS. 1-3. Retainer ring 207 is fixed to tube member 42 along an inner surface thereof. Retainer ring 207 being fixed in position along tube member 42 serves to maintain downstream components of injector 12 in fixed positions within first injector body portion 38. In an example embodiment, retainer ring 207 is welded along the inner surface of tube member 42. Such weld connection is formed along an entire circumference of the upper edge of retainer ring 207. It is understood, however, that other connection mechanisms may be utilized for fixing retainer ring 207 to tube member 42.

Figure 4:
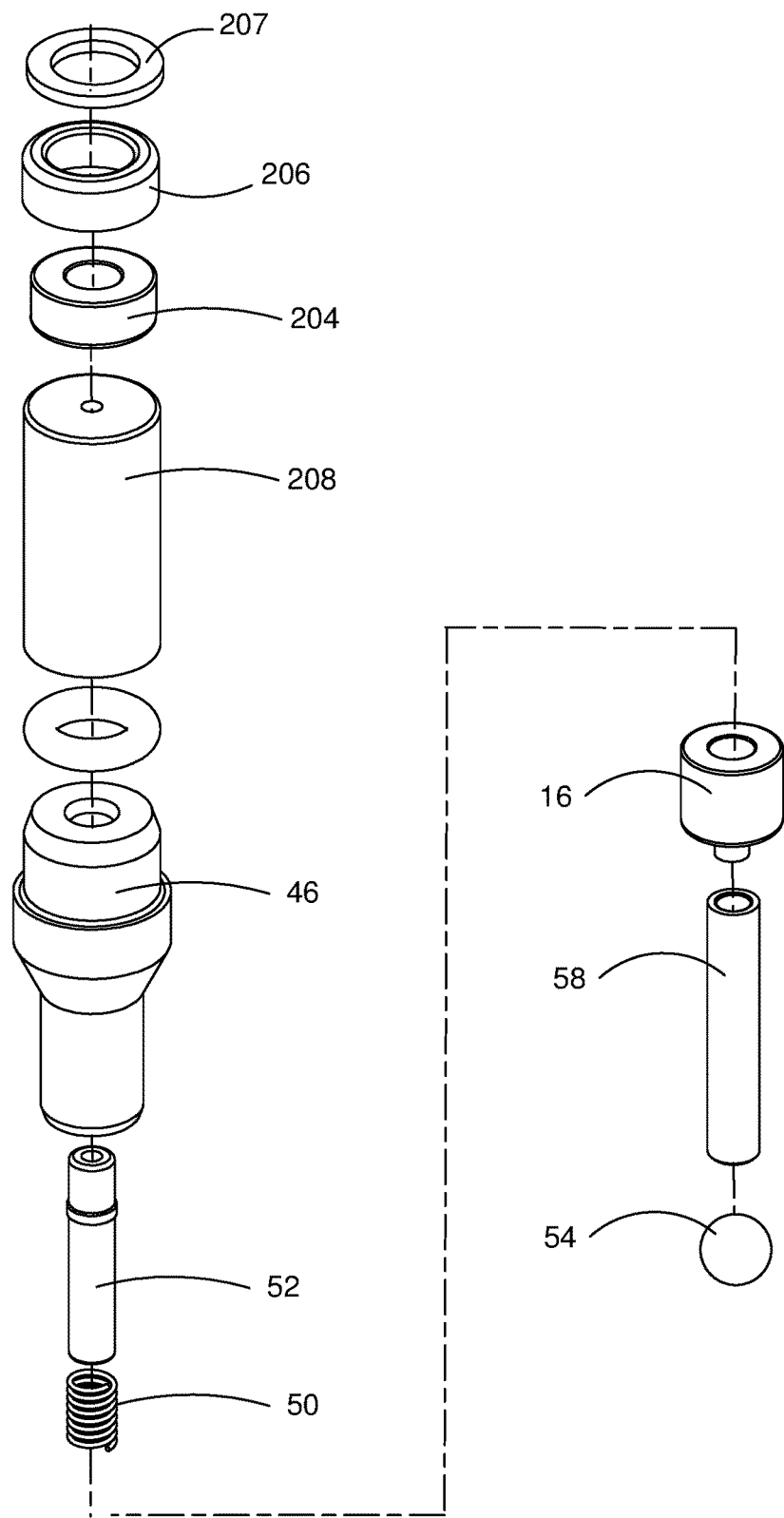
FIG. 4 is an exploded perspective view of components of the fluid injector of the RDU of FIG. 1 according to an example embodiment.

Referring to FIGS. 1-4, injector 12 further includes a volume reduction member 208 which serves to further reduce the volume of the reductant fluid path within injector 12. Reduction member 208 is largely cylindrical in shape, as shown in FIG. 4, having a top (upstream) end and a bottom (downstream) end. In an embodiment, volume reduction member 208 is constructed from a metal, such as stainless steel. It is understood, though, that volume reduction member 208 may be formed from other metals or metal compositions. The outer surface of volume reduction member 208 is sized to contact the inner surface of tube member 42.

Volume reduction member 208 further includes a bore 208A (FIGS. 2 and 3) defined in the axial direction through volume rejection member 208, from one axial (top) end to the other axial (bottom) end. Bore 208A is located along the longitudinal axis of volume reduction member 208 and itself forms part of the fluid path for passing reductant through injector 12. Bore 208A forms the only fluid path for passing reductant through or around volume reduction member 208. In an example embodiment, the diameter of bore 208A is between 12% and 20% of the outer diameter of volume reduction member 208, such as about 16%. Because volume reduction member 208 extends radially to the inner surface of tube member 42, and because the diameter of bore 208A is small relative to the outer diameter of volume reduction member 208, volume reduction member 208 reduces the space or volume in which reductant may reside within injector 12, thereby reducing the volume of the fluid path of reductant therein. Volume reduction member 208 further assists in retaining spring adjustment tube 52 in position within injector 12 such that pin adjustment tube 52 maintains a desired force on spring 50 so as to prevent a loss of calibration. Specifically, retainer ring 207 maintains the position of filter 204 and corresponding cap member 206, which maintain the position of volume reduction member 208, which maintains the position of spring adjustment member 52.

With reference to FIGS. 1-4, fluid injector 12 further includes a volume compensation member 210 which is disposed between the bottom (downstream) end of volume reduction member 208 and the top of pole piece 46. Volume compensation member 210 is constructed from elastic material and serves to occupy the space between volume reduction member 208 and pole piece 46 so as to further lessen the volume of the reductant fluid path in injector 12. Volume compensation member 210 may be in a compressed state in injector 12 when assembled, and contact the volume reduction member 208, pole piece 46, the inner surface of tube member 42 and the outer surface of spring adjustment member 52.

FIG. 5 illustrates a downstream end portion of fluid injector 12. As can be seen, seat 56 includes a bore defined axially through seat 56. In an example embodiment, the length of the throughbore of seat 56 is reduced so as to further reduce the volume of the reductant fluid path through seat 56, and particularly the sac volume below the sealing band of seat 56 which engages with seal member 54.

According to an example embodiment, fluid injector 12 includes a plurality of orifice discs 212 disposed in a stacked arrangement. The orifice disc stack is disposed against the downstream end of seat 56. In the example embodiment illustrated in FIG. 5, the disc stack includes a first disc 212A having one or more orifices that are configured for providing the desired spray pattern of reductant exiting injector 12. It is understood that the dimension and locations of the orifices of first disc 212A may vary and be dependent upon the reductant dosing requirements of the particular vehicle engine. The disc stack further includes a second disc 212B which is disposed downstream of first disc 212A and includes orifices through which the reductant spray passes. Second disc 212B has a larger thickness than the thickness of first disc 212A and being disposed against first disc 212A, and supports first disc 212A so as to prevent the thinner first disc 212A from deforming due to expansion forces from frozen reductant upstream of first disc 212A.

As discussed above, fluid injector 12, and particularly the components thereof, are configured to reduce the volume of the reductant fluid path in injector 12. In example embodiments, the ratio of the volume of the fluid path in fluid injector 12 to a volume of the components of injector 12 (including but not necessarily limited to coil 14, armature 16, pole piece 46, spring adjustment tube 52, volume reduction member 208, volume compensation member 210, filter 204, retaining ring 207, spring 50, pin member 58, seal member 54, seat 56, first injector body portion 20A and valve body portion 40) is between 0.08 and 0.30, and particularly between 0.12 and 0.20, such as about 0.15. These volume amounts are calculated between orthogonal planes relative to the longitudinal axis of fluid injector 12—from a first plane along the open end of tube member 42 (i.e., fluid inlet 30) and a second plane along the lowermost (downstream) surface of second disc 212B (i.e., fluid outlet 32). It is understood that the particular ratio of volume of the reductant path to injector component volume within fluid injector 12 may vary depending upon a number of cost and performance related factors, and may be any value between about 0.08 and about 0.30. Providing a fluid injector having a reduced ratio of reductant fluid path volume to injector component volume to fall within the above range advantageously results in less reductant in injector 12 which reduces the susceptibility of RDU 10 being damaged if the reductant in injector 12 freezes.

Figure 6:
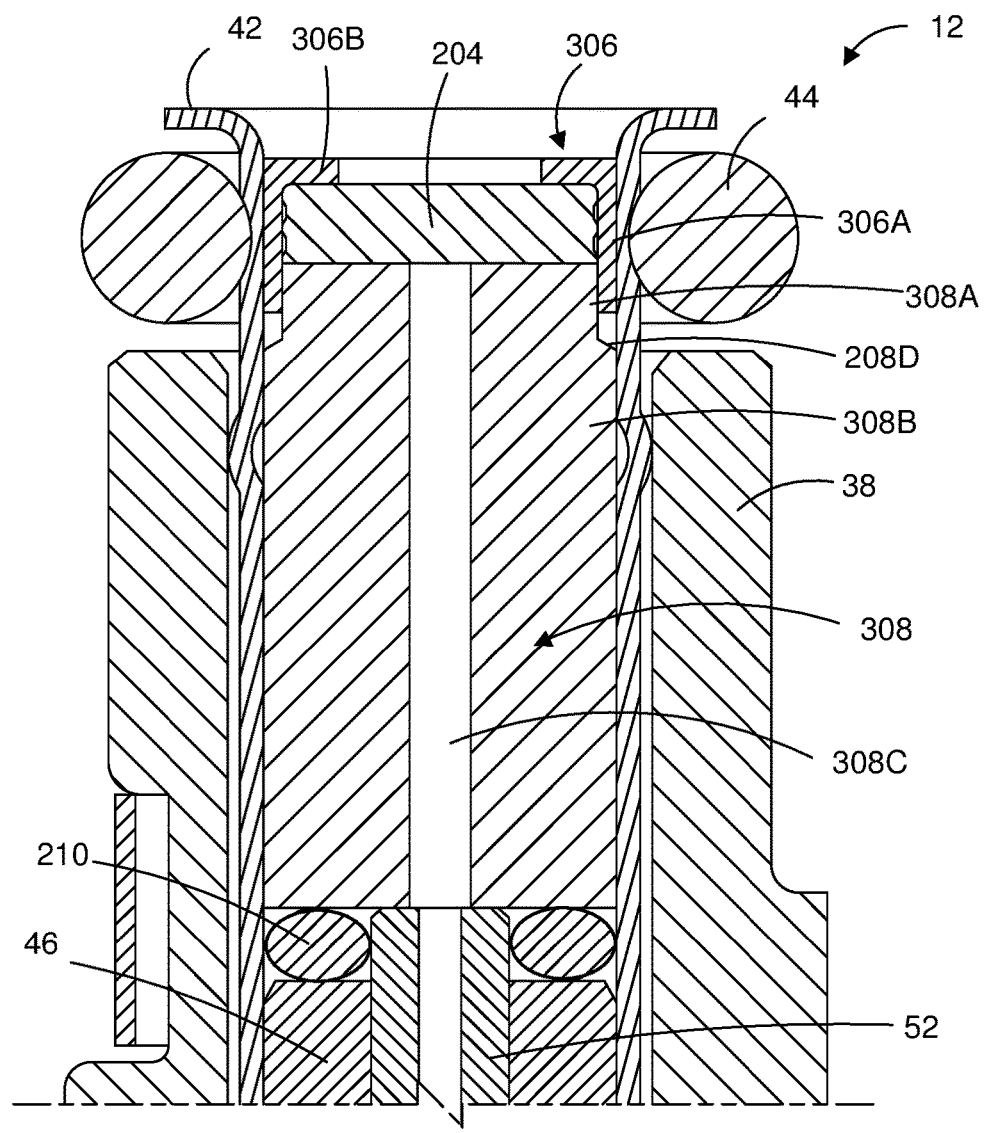
FIG. 6 is a magnified cross-sectional view of the inlet portion of the fluid injector of the RDU of FIG. 1 according to another example embodiment.
Figure 7:
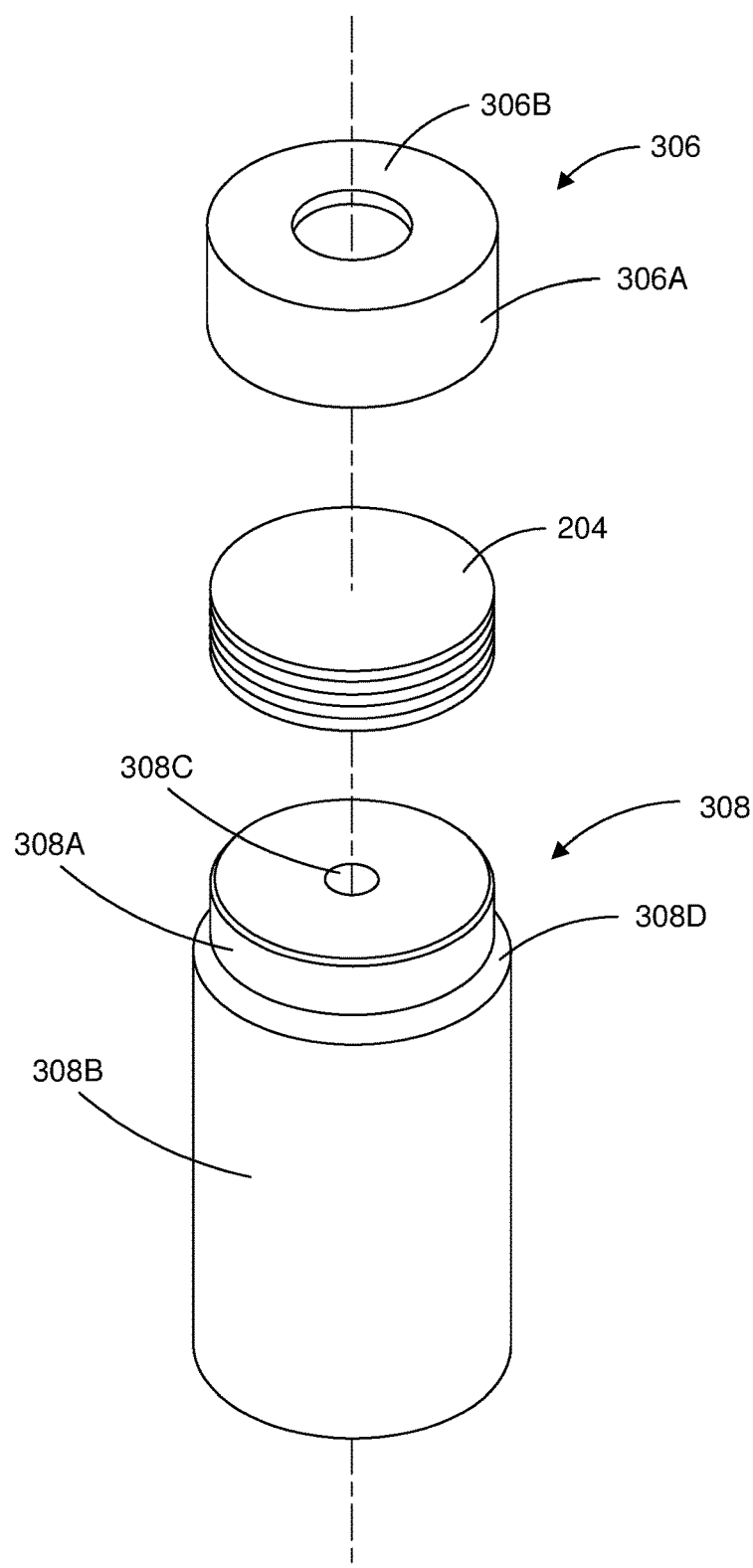
FIG. 7 is an exploded perspective view of components of the fluid injector of FIG. 6.
Figure 8:
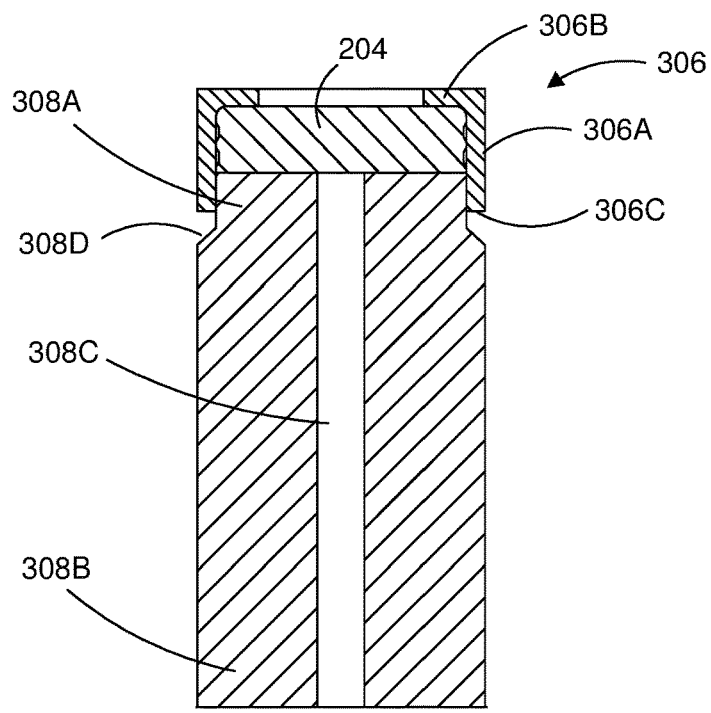
FIG. 8 is a cross-sectional view of the components of FIG. 6.

In another example embodiment, shown in FIGS. 6-8, fluid injector 12 includes a volume reduction member 308 which has many of the characteristics of volume reduction member 208 discussed above with respect to FIGS. 1-5. Similar to volume reduction member 208, volume reduction member 308 is constructed from stainless steel or like composition, is disposed in tube member 42 of fluid injector 12 between volume compensation member 210 and filter 204. However, volume reduction member 308 includes a first portion 308A and a second portion 308B. As shown in FIG. 7, each of first portion 308A and second portion 308B has a cylindrical shape, with the outer diameter of first portion 308A being less than the outer diameter of second portion 308B. The outer diameter of first portion 308A is less than the diameter of second portion 308B by the thickness of sidewall 306A of cap member 306, as will be explained in greater detail below. Volume reduction member 308 includes top (upstream) and bottom (downstream) end portions which form the axial ends of first portion 308A and second portion 308B, respectively. The outer surface of second portion 308B is sized to contact the inner surface of tube member 42.

As mentioned, the outer diameter of first portion 308A of volume reduction member 308 is less than the outer diameter of second portion 308B thereof. As shown in FIGS. 6-8, volume reduction member 308 includes an angled annular surface or skirt 308D, which extends in the axial direction between the outer surface of first portion 308A and the outer surface of second portion 308B and serves as the physical interface therebetween. The angle of angled surface 308D, relative to the longitudinal axis of volume reduction member 308 and/or injector 12, is an acute angle. Alternatively, the angle of angled surface 308D is orthogonal to the longitudinal axis of volume reduction member 308 and/or injector 12.

Volume reduction member 308 further includes a bore 308C defined in the axial direction through volume rejection member 308, from one axial (top) end to the other axial (bottom) end. Bore 308C is located along the longitudinal axis of volume reduction member 308 and itself forms part of the reductant fluid path for passing reductant through injector 12, and the only reductant fluid path through or around volume reduction member 308. In an example embodiment, the diameter of the bore 308C is between 12% and 20% of the outer diameter of volume reduction member 308, such as about 16%. Because volume reduction member 308 extends to the inner surface of tube member 42 and because the diameter of bore 308C is relatively small relative to the outer diameter of volume reduction member 308, volume reduction member 308 occupies a volume within injector 12 which reduces the space or volume of the reductant fluid path through injector 12, thereby reducing the amount of reductant in injector 12 that could freeze and potentially damage injector 12.

Cap member 306 includes a number of the same characteristics of cap member 206 described above with respect to FIGS. 1-5. As shown in FIG. 7, cap member 306 is largely cylindrically shaped having a sidewall 306A extending circumferentially and defining an inner volume sized for receiving filter 204 therein. Cap member 306 is dimensioned to fit within tube member 42, and particularly so that the outer surface of sidewall 306A of cap member 306 contacts the inner surface of tube member 42. Cap member 306 further includes an annular member 306B disposed along the axial (upstream) end of cap member 306 and extending radially inwardly from sidewall 306A. Annular member 306B serves to maintain filter 204 within cap member 306 in a fixed position. Like cap member 206, cap member 306 is constructed of metal or like compositions and provides structural support to filter 204.

In example embodiments, cap member 306 is engaged with and secured to volume reduction member 308. In this way, filter 204, cap member 306 and volume reduction member 308 form a single, unitary and integrated component, as shown in FIG. 8. Having a single, unitary component formed from filter 204, cap member 306 and volume reduction member 308 advantageously allows for a simpler and less complex process for assembling injector 12 during manufacture thereof.

In the example embodiments, cap member 306 fits over and engages with or otherwise attaches to at least a part of first portion 308A of volume reduction member 308, as shown in FIGS. 6 and 8. In one example embodiment, cap member 306 forms a press fit engagement with first portion 308A. In another example embodiment, cap member 306 is welded to first portion 308A, such as a fillet weld between bottom surface 306C of cap member 306 and the radially outer surface of first portion 308A. In each such embodiment, the angled surface 308D provides sufficient spacing for securing cap member 306 to first portion 308A. It is understood that cap member 306 may be secured to first portion 308A of volume reduction member 308 via other mechanisms.

With cap member 306 fitting over first portion 308A of volume reduction member 308, the outer diameter of sidewall 306A is the same or nearly the same as the outer diameter of second portion 308A. See FIGS. 6 and 8.

Figure 9:
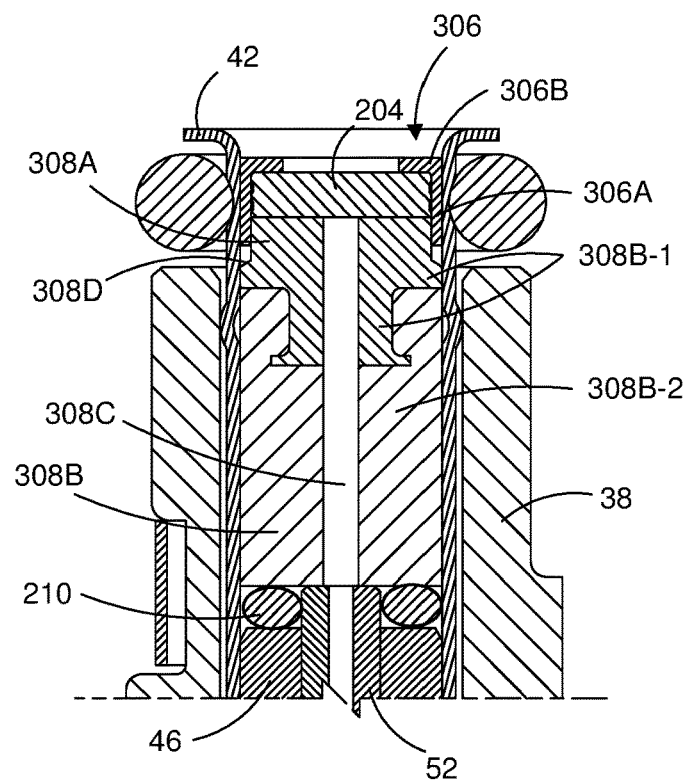
FIG. 9 is a magnified cross-sectional view of the inlet portion of the fluid injector of the RDU of FIG. 1 according to yet another example embodiment.
Figure 11:
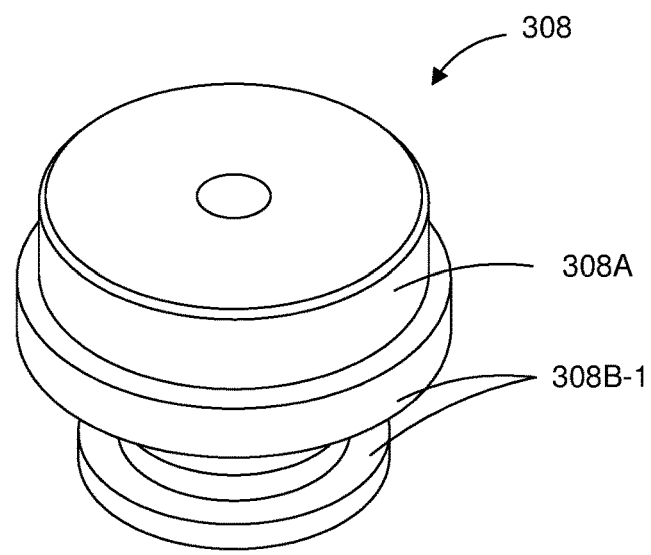
FIG. 11 is a perspective view of a component of the fluid injector of FIG. 9.
Figure 10:
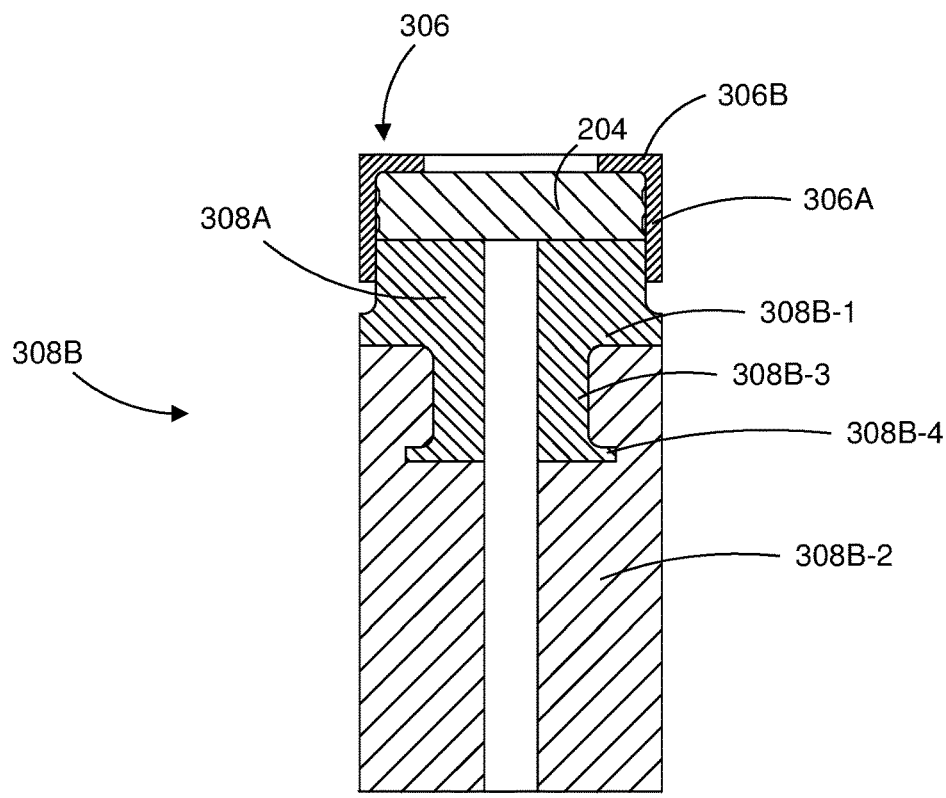
FIG. 10 is a cross-sectional view of components of the fluid injector of FIG. 9.

As discussed above, volume reduction member 308 is constructed from metal, such as stainless steel, according to an example embodiment. In another example embodiment, a part of second portion 308B is constructed from plastic or like compositions. Specifically, as illustrated in FIGS. 9-11, first portion 308A and a first part 308B-1 of second portion 308B are formed as a single metal member, and a second part 308B-2 of second portion 308B is plastic overmolded around the first part thereof. FIG. 11 shows the metal first portion 308A and first part 308B-1 of second portion 308B. First part 308B-1 of second portion 308B includes intermediate section 308B-3 which extends away from first portion 308A in an axial (downstream) direction, and distal section 308B-4 which is attached to intermediate section 308B-3 and extends in the axial (downstream) direction therefrom, as shown in FIG. 10. Distal section 308B-4 extends in a radial direction further from a longitudinal axis of volume reduction member 308 (and/or injector 12) than the radial extension of intermediate section 308B-3 so as to form a ledge. Second part 308B-2 of second portion 308B, made of overmolded plastic or other like compositions, is formed around the ledge formed by intermediate section 308B-3 and distal section 308B-4 so as to form volume reduction member 308 as a single, unitary and integrated component. As discussed above, volume reduction member 308 is connected to cap member 306 so as to result in volume reduction member 308, filter 204 and cap member 306 forming a single assembly component for use in assembling injector 12.

During assembly of injector 12, the single assembly component (filter 204, cap member 306 and volume reduction member 308) is inserted within tube member 42 under pressure while contacting volume compensator 212. Following insertion and while still under pressure, cap member 306 is welded to tube member 42 all along the intersection thereof along the top portion of tube member 42. In an embodiment, the weld connection is a fillet weld.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A reductant delivery unit, comprising:
a fluid injector having a fluid inlet disposed at a first end of the fluid injector for receiving a reductant, and a fluid outlet disposed at a second end of the fluid injector for discharging the reductant, the fluid injector defining a fluid path for the reductant from the fluid inlet to the fluid outlet, the fluid injector comprising:
a tube member having an end disposed at the fluid inlet of the fluid injector, the tube member configured to pass reductant along the fluid path;
a filter disposed in the tube member proximal to the fluid inlet of the fluid injector;
a volume reduction member disposed in the tube member downstream of the filter, relative to a direction of reductant flow along the fluid path from the fluid inlet to the fluid outlet of the fluid injector, the volume reduction member contacting an inner surface of the tube member and including a bore defined through the volume reduction member, the bore defining at least a portion of the fluid path through the fluid injector, the bore having a smaller diameter than an outer diameter of the volume reduction member and the volume reduction member occupying a volume in the tube member such that the volume reduction member reduces a volume of the fluid path for reductant to occupy in the fluid injector;

a cap member in which the filter is disposed, the cap member engaged with and secured to the volume reduction member such that the filter, the volume reduction member and the cap form a single member;

a movable armature disposed within the fluid injector;

a spring disposed within the fluid injector and having a first longitudinal end which contacts the movable armature and a second longitudinal end;

a spring adjustment tube disposed upstream, relative to the direction of reductant flow along the fluid path, of the movable armature and the spring, and having a first longitudinal end which contacts the second longitudinal end of the spring, and a second longitudinal end which is adjacent to and contacts the volume reduction member without being disposed within the volume reduction member;

a stationary pole piece disposed within the fluid injector and having a first longitudinal end which is engaged or spaced apart from the movable armature and a second longitudinal end, the stationary pole piece including a through-bore in which the spring adjustment tube is partly disposed; and a volume compensation member constructed from a compressible material and disposed in a compressed state between and contacting the second longitudinal end of the pole piece and a downstream end, relative to the direction of reductant flow along the fluid path, of the volume reduction member.

2. The reductant delivery unit of claim 1, wherein the volume reduction member comprises a first portion and a second portion, the first portion having a smaller outer diameter than an outer diameter of the second portion, and the cap member is engaged with the first portion of the volume reduction member.

3. The reductant delivery unit of claim 2, wherein the cap member and the first portion of the volume reduction member are metal.

4. The reductant delivery unit of claim 2, wherein at least some of the first portion of the volume reduction member is disposed within the cap member, and an outer diameter of the cap member is equal to the outer diameter of the second portion of the volume reduction member.

5. The reductant delivery unit of claim 4, wherein the cap member has a press fit engagement with the first portion of the volume reduction member.

6. The reductant delivery unit of claim 4, wherein the cap member is connected to the first portion of the volume reduction member, the connection between the cap member and the first portion of the volume reduction member comprising a weld connection.

7. The reductant delivery unit of claim 2, wherein the volume reduction member includes an angled surface between the first portion and the second portion, the angled surface being at an angle other than an angle that is orthogonal to a longitudinal axis of the volume reduction member.

8. The reductant delivery unit of claim 2, wherein the first portion and a first part of the second portion of the volume reduction member are of a metal composition and a second part of the second portion of the volume reduction member is a plastic composition.

9. The reductant delivery unit of claim 8, wherein the second part of the second portion of the volume reduction member is overmolded over at least some of the first part of the second portion thereof.

10. The reductant delivery unit of claim 8, wherein the first part of the second portion of the volume reduction member defines a ledge which the second part of the second portion of the volume reduction member is molded around, the ledge being disposed radially inwardly of the outer diameter of the second portion of the volume reduction member.

11. The reductant delivery unit of claim 1, wherein the cap member includes a cylindrically shaped sidewall having first and second axial ends, and an annular member which extends radially inwardly from the first axial end, and wherein the second axial end of the cap member is disposed around and is engaged with a portion of the volume reduction member.

12. A fluid injector, comprising:

a fluid inlet disposed at a first end of the fluid injector for receiving a fluid, and a fluid outlet disposed at a second end of the fluid injector for discharging the fluid, the fluid injector defining a fluid path from the fluid inlet to the fluid outlet;

a tube having an end disposed at the fluid inlet of the fluid injector, the fluid path passing through the tube;

a filter disposed in the tube proximal to the fluid inlet of the fluid injector;

a volume reduction member disposed in the tube downstream of the filter, relative to a direction of fluid flow from the fluid inlet to the fluid outlet of the fluid injector, the volume reduction member contacting an inner surface of the tube and including a bore defined through the volume reduction member, the bore defining at least a portion of the fluid path through the fluid injector, the bore having a smaller diameter than an inner diameter of the tube and the volume reduction member occupying a volume in the tube such that the volume reduction member reduces a volume of the fluid path in the fluid injector;

a cap member in which the filter is disposed, the cap member attached to the volume reduction member such that the filter, the volume reduction member and the cap form a single assembly;

a movable armature disposed within the fluid injector;

a spring disposed within the fluid injector and having a first longitudinal end which contacts the movable armature and a second longitudinal end;

a spring adjustment tube disposed upstream, relative to the direction of fluid flow along the fluid path, of the movable armature and the spring, and having a first longitudinal end which contacts the second longitudinal end of the spring, and a second longitudinal end which is adjacent to and contacts the volume reduction member without being disposed within the volume reduction member;

a stationary pole piece disposed within the fluid injector and having a first longitudinal end which is engaged or spaced apart from the movable armature and a second longitudinal end, the stationary pole piece including a through-bore in which the spring adjustment tube is partly disposed; and a volume compensation member constructed from a compressible material and disposed in a compressed state between the second longitudinal end of the pole piece and a downstream end, relative to the direction of fluid flow along the fluid path, of the volume reduction member, the volume compensation member contacting the second longitudinal end of the pole piece and the downstream end of the volume reduction member.

13. The fluid injector of claim 12, wherein the volume reduction member comprises a first portion and a second portion, the first portion having a smaller outer diameter than an outer diameter of the second portion, and the cap member is attached to the first portion of the volume reduction member.

14. The fluid injector of claim 13, wherein the first portion of the volume reduction member is disposed within the cap member and an outer diameter of the cap member is equal to the outer diameter of the second portion of the volume reduction member.

15. The fluid injector of claim 13, wherein the cap member has a press fit attachment to the first portion of the volume reduction member.

16. The fluid injector of claim 13, wherein the cap member is fixed to the first portion of the volume reduction member via a weld connection.

17. The fluid injector of claim 13, wherein the volume reduction member includes an angled surface between the first portion and the second portion, the angled surface is at an angle other than an angle that is orthogonal to a longitudinal axis of the volume reduction member.

18. The fluid injector of claim 13, wherein the first portion and a first part of the second portion of the volume reduction member are of a metal composition and a second part of the second portion of the volume reduction member is a plastic composition.

19. The fluid injector of claim 18, wherein the second part of the second portion of the volume reduction member is overmolded over some of the first part of the second portion of the volume reduction member, the first part of the second portion of the volume reduction member defines a ledge which the second part of the second portion of the volume reduction member is molded around, the ledge being disposed radially inwardly of the outer diameter of the second portion of the volume reduction member.

20. The fluid injector of claim 12, wherein the fluid injector forms part of a reductant delivery unit and wherein the cap member includes a cylindrically shaped sidewall having first and second axial ends, and an annular member which extends radially inwardly from the first axial end, and wherein the second axial end of the cap member is disposed around and is engaged with a portion of the volume reduction member.

21. The reductant delivery unit of claim 1, further comprising a volume compensation member constructed from a compressible material and disposed in a compressed state between the second longitudinal end of the pole piece and a downstream end, relative to the direction of fluid flow along the fluid path, of the volume reduction member, wherein the volume compensation member contacts the second longitudinal end of the pole piece and the downstream end of the volume reduction member and is disposed around the spring adjustment tube.

* * * * *